United States Patent
Matsuyama et al.

(10) Patent No.: US 6,860,640 B2
(45) Date of Patent: Mar. 1, 2005

(54) TAPERED ROLLER BEARING

(75) Inventors: Hiroki Matsuyama, Nara (JP); Kanichi Kouda, Osaka (JP)

(73) Assignee: Koyo Seiko Co., Ltd., Osaka (JP)

( * ) Notice: Subject to any disclaimer, the term of this patent is extended or adjusted under 35 U.S.C. 154(b) by 95 days.

(21) Appl. No.: 10/445,326

(22) Filed: May 27, 2003

(65) Prior Publication Data
US 2004/0017957 A1 Jan. 29, 2004

(30) Foreign Application Priority Data
May 27, 2002 (JP) ................................. P.2002-152528

(51) Int. Cl.⁷ ............................................ F16C 33/36
(52) U.S. Cl. ..................................... 384/571; 384/450
(58) Field of Search .............................. 384/571, 450, 384/569, 565

(56) References Cited

U.S. PATENT DOCUMENTS 6,086,261 A  7/2000  Nakagawa et al.
6,464,398 B2 * 10/2002 Takehara et al. ............ 384/450

FOREIGN PATENT DOCUMENTS

| EP | 0 756 095 A2 | 1/1997 |
| EP | 1 158 192 A2 | 11/2001 |
| JP | 09-096352 | 4/1997 |
| JP | 11-210765 | 8/1999 |

* cited by examiner

Primary Examiner—Thomas R. Hannon
(74) Attorney, Agent, or Firm—McGinn & Gibb, PLLC

(57) ABSTRACT

In a tapered roller bearing having an outer ring whose outside diameter is D, an inner ring whose inside diameter is d, and a plurality of tapered rollers whose pitch circle diameter is dm, a setting is provided such that a PCD parameter expressed by $2dm/(D+d)$ is a value which falls within the range of 0.96 to 0.985.

3 Claims, 6 Drawing Sheets

TAPERED ROLLER BEARING

BACKGROUND OF THE INVENTION

The present invention relates to a tapered roller bearing.

A tapered roller bearing which is used for supporting a pinion shaft in a differential gear of an automobile is lubricated by a large quantity of high-viscosity gear oil. For this reason, friction (dynamic friction) torque ascribable to rolling viscous resistance and the agitation resistance of oil is large, which constitutes one factor deteriorating the fuel consumption of the automobile. Accordingly, to promote further low fuel consumption, it is desirable to reduce the friction torque as practically as possible. To reduce the friction torque, it is known that it suffices if, for example, the number of tapered rollers is reduced, their length is shortened, or their diameter is made small. However, the reduction of the friction torque in such a manner leads to a substantial decline in the load carrying capacity as the bearing, so that it is not expedient to do so.

SUMMARY OF THE INVENTION

In view of the above-described conventional problems, the object of the invention is to reduce the friction torque while suppressing a decline in the load carrying capacity of the tapered roller bearing.

The tapered roller is characterized by including an outer ring whose outside diameter is D, an inner ring whose inside diameter is d, and a plurality of tapered rollers which are interposed between the outer ring and the inner ring and whose pitch circle diameter is dm, wherein a PCD parameter expressed by 2 dm/(D+d) is a value which falls within a range of 0.96 to 0.985.

The friction torque of the above-described tapered roller bearing changes with a correlation with the PCD parameter, and by setting the PCD parameter in the aforementioned range, it is possible to reduce the friction torque while suppressing a decline in the load carrying capacity.

In addition, in the above-described tapered roller bearing, a contact angle $\alpha$ of the outer ring is preferably set such that $22° \leq \alpha \leq 26°$.

In this case, it is possible to reduce the friction torque without causing rigidity and the load carrying capacity to decline.

DETAILED DESCRIPTION OF PREFERRED EMBODIMENTS

Figure 1:
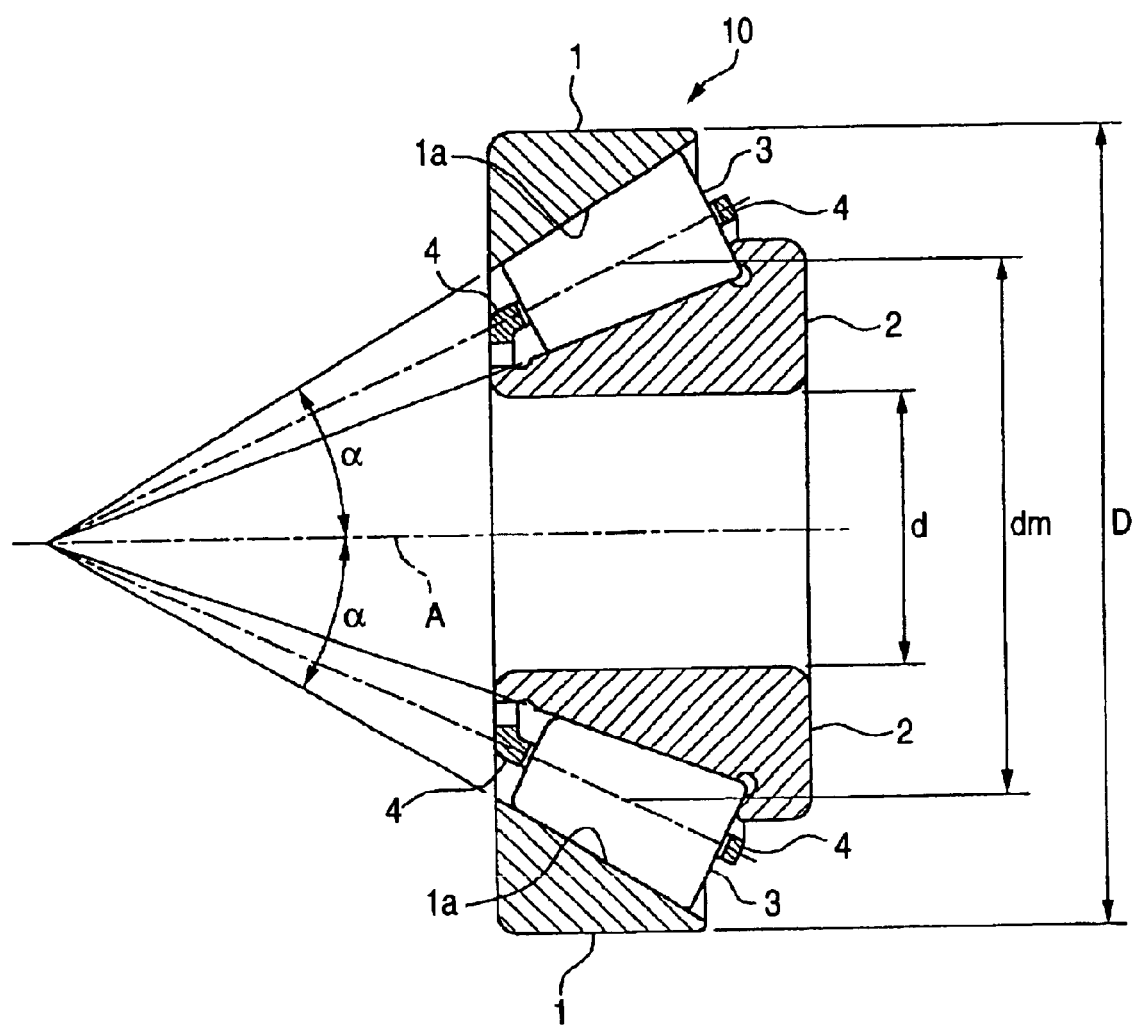
FIG. 1 is a cross-sectional view of a tapered roller bearing in accordance with an embodiment of the invention.

FIG. 1 is a cross-sectional view of a tapered roller bearing in accordance with an embodiment of the invention. This tapered roller bearing is used for supporting, for example, a pinion shaft in a differential gear of an automobile. In the drawing, a tapered roller bearing 10 is constructed such that a plurality of tapered rollers 3 are interposed between an outer ring 1 and an inner ring 2. The tapered rollers 3 are held by a retainer 4. Here, it is assumed that an outside diameter of the outer ring 1 is D, that an inside diameter of the inner ring 2 is d, and that a pitch circle diameter of the tapered roller 3 is dm. Further, it is assumed that the contact angle of the outer ring 1, i.e., an angle formed by an inner peripheral surface 1a with respect to an axis A, is $\alpha$.

Figure 2A:
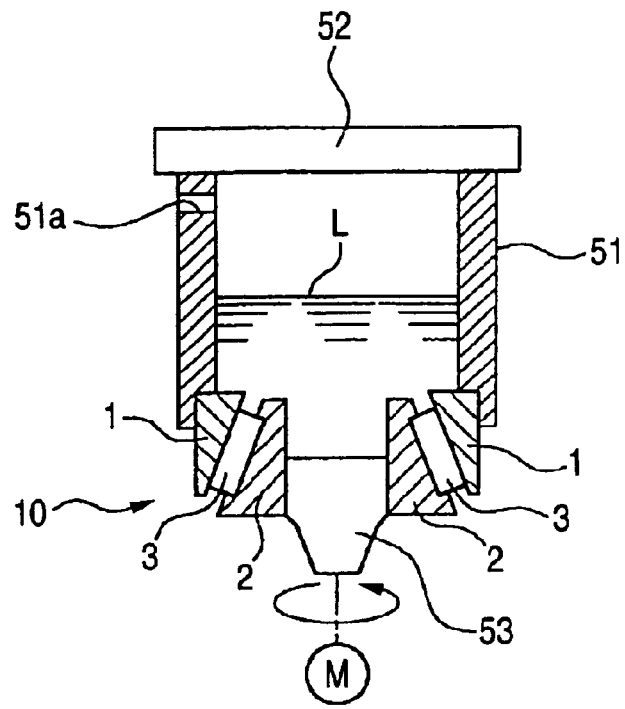
FIG. 2A is a diagram illustrating a schematic construction of a device for measuring the friction torque of the tapered roller bearing.
Figure 2B:
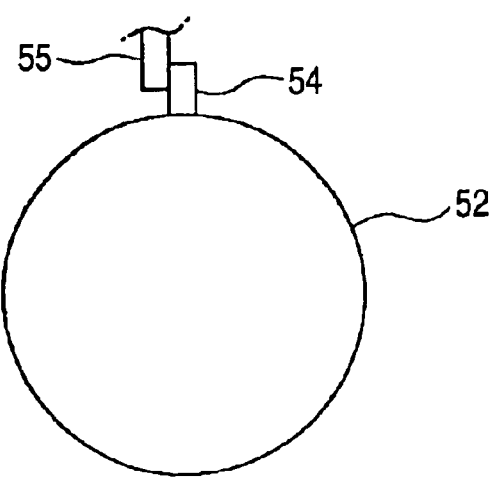
FIG. 2B is a plan view of a load plate of that device.

FIG. 2A is a cross-sectional view illustrating a schematic construction of a device for measuring the friction torque of the tapered roller bearing 10. As shown in FIG. 2A, a hollow cylindrical housing 51 and a disk-shaped load plate 52 are mounted on the outer ring 1 side of the tapered roller bearing 10, the load plate 52 is supported by an air bearing (not shown), and a main shaft portion 53 inserted in the inner ring 2 is rotated by a motor M in this state. FIG. 2B is a plan view of the load plate 52. As the inner ring 2 rotates, the outer ring 1 thereby rotates in an accompanying manner, and an engaging portion 54 provided on the outer periphery of the load plate 52 abuts against a strain gage 55 on a stationary side. At this time, it is possible to measure the friction torque on the basis of the product of the force detected by the strain gage 55 and the radius from the center of the load plate 52 to the engaging portion 54. It should be noted that by assuming the working condition in the differential gear, lubricating oil L was supplied through an oiling port 51a of the housing 51, and the torque was measured in a state in which the lubricating oil L was completely filled on the back face side of the bearing. In addition, the axial load based on the load plate 52 and the housing 51 was set to 6 kN, the rotational speed of the motor was capable of being set in the range of 500 to 3000 rpm, and gear oil having a temperature of 50° C. was used as the lubricating oil L.

The results shown in Table 1 below were obtained by conducting the following examination: By using as a PCD parameter a numerical value expressed by $\epsilon = 2 \, dm/(D+d)$, with respect to 13 kinds of samples whose PCD parameters $\epsilon$ and contact angles $\alpha$ differed, an examination was made as to what values the rated value C and the total displacement $\delta$ assumed and what value the friction torque T assumed in a state in which the aforementioned motor was rotated at a predetermined speed.

TABLE 1

| Sample No. | $\alpha$ -deg- | $\epsilon$ | C -kN- | $\delta$ -mm- | T -N · m- | Torque ratio |
|---|---|---|---|---|---|---|
| 1 | 20 | 0.998 | 56.5 | 0.021 | 0.800 | 1.00 |
| 2 | 20 | 0.990 | 56.5 | 0.021 | 0.775 | 0.97 |
| 3 | 20 | 0.985 | 58.9 | 0.023 | 0.723 | 0.90 |
| 4 | 20 | 0.970 | 56.6 | 0.024 | 0.688 | 0.86 |

TABLE 1-continued

| Sample No. | α -deg- | ε | C -kN- | δ -mm- | T -N·m- | Torque ratio |
|---|---|---|---|---|---|---|
| 5 | 20 | 0.960 | 56.6 | 0.022 | 0.708 | 0.89 |
| 6 | 20 | 0.950 | 56.6 | 0.020 | 0.768 | 0.96 |
| 7 | 22 | 0.977 | 56.5 | 0.020 | 0.670 | 0.84 |
| 8 | 22 | 0.950 | 56.5 | 0.016 | 0.742 | 0.93 |
| 9 | 24 | 0.998 | 57.8 | 0.014 | 0.773 | 0.97 |
| 10 | 24 | 0.969 | 56.6 | 0.016 | 0.676 | 0.85 |
| 11 | 26 | 0.990 | 56.3 | 0.012 | 0.756 | 0.95 |
| 12 | 26 | 0.974 | 56.5 | 0.014 | 0.653 | 0.82 |
| 13 | 28 | 0.968 | 53.8 | 0.012 | 0.621 | 0.78 |

It should be noted that Sample 1 was a tapered roller bearing based on a conventional design, and the torque ratio was calculated by using the torque ratio of that tapered roller bearing as being 1.

Figure 3:
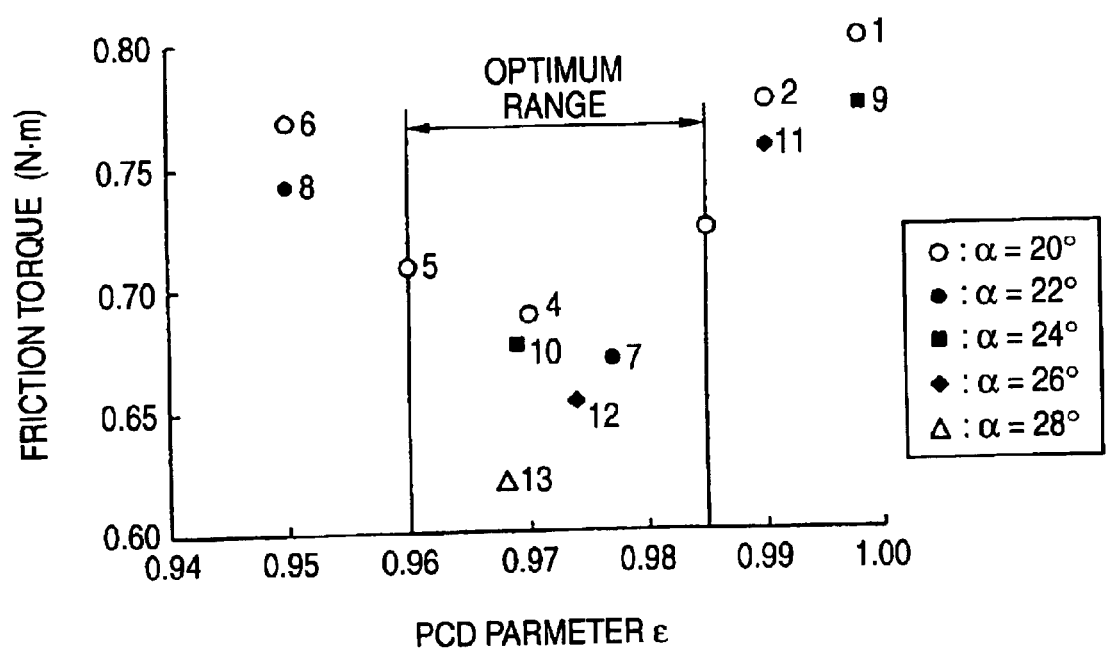
FIG. 3 is a graph illustrating the relationship between a PCD parameter $\epsilon$ and friction torque on the basis of Table 1.

FIG. 3 is a graph illustrating the relationship between the PCD parameter ε and the friction torque T on the basis of the results shown in Table 1 above. Symbols at the plotted points differ depending on the contact angle α, and are as shown in the graph. In addition, numerals in the vicinities of the plotted points show sample numbers. As is evident from this graph, it became clear that a substantially V-shaped correlation is present between the PCD parameter ε and the friction torque T. Accordingly, it is possible to demarcate the range of the PCD parameter ε for suppressing the friction torque T. Further, the PCD parameter ε in the range of 0.96 to 0.985, which realizes a reduction in torque of 10% or more with respect to Sample 1, can be set as an optimum range for suppressing the friction torque T. More preferably, the PCD parameter ε is set in the range of 0.97 to 0.98.

It should be noted that, of the plotted points in the aforementioned optimum range, as for Samples 3 to 5 whose contact angle α was 20°, since the total displacement δ (the root mean square of the radial displacement and the axial displacement) increased more than that of Sample 1 as shown in Table 1, it is considered that rigidity declined slightly. However, since the rated load C was equal to or increased over that of Sample 1, it is considered that Samples 3 to 5 are capable of withstanding practical use. In addition, of the plotted points in the aforementioned optimum range, as for Sample 13 whose contact angle α was 28°, the rated load C, i.e., the load carrying capacity, was lower than that of Sample 1, but its decline rate was 5% or thereabouts, so that it is considered that Sample 13 is barely at a permissible level. It should be noted, however, that it is preferable to avoid the contact angle α from being set to 20° or 28° and to set it such that $22° \leq \alpha \leq 26°$.

Next, with respect to two kinds of tapered roller bearings having different sizes, Examples 1 and 2 of the invention in which the PCD parameter ε was in the range of 0.96 to 0.985 were respectively compared with Comparative Examples (conventional examples) 1 and 2 in which the PCD parameter ε was not in that range. A comparison was made in the change of the friction torque with respect to the rotational speed, the rated load ratio, the total displacement ratio, and the calculated service life ratio. Comparative data are shown in Tables 2 and 3 below. Table 2 shows the comparative data with respect to tapered roller bearings in which d=35 mm, D=80 mm, and axial width=32.75 mm. Table 3 shows the comparative data with respect to tapered roller bearings in which d=40 mm, D=85 mm, and axial width=24.75 mm.

TABLE 2 d = 35 mm, D = 80 mm, and width = 32.75 mm

| | Comparative Example 1 | Example 1 |
|---|---|---|
| Contact angle α | 20° | 24° |
| PCD parameter ε | 0.998 | 0.972 |
| Rated load ratio | 1 | 1.00 |
| Total displacement ratio | 1.00 | 0.88 |
| Service life ratio (calculated) | 1.00 | 1.60 |

TABLE 3 d = 40 mm, D = 85 mm, and width = 24.75 mm

| | Comparative Example 2 | Example 2 |
|---|---|---|
| Contact angle α | 22° 30` | 26° |
| PCD parameter ε | 1.012 | 0.977 |
| Rated load ratio | 1 | 0.99 |
| Total displacement ratio | 1.00 | 1.00 |
| Service life ratio (calculated) | 1.00 | 1.41 |

Figure 4:
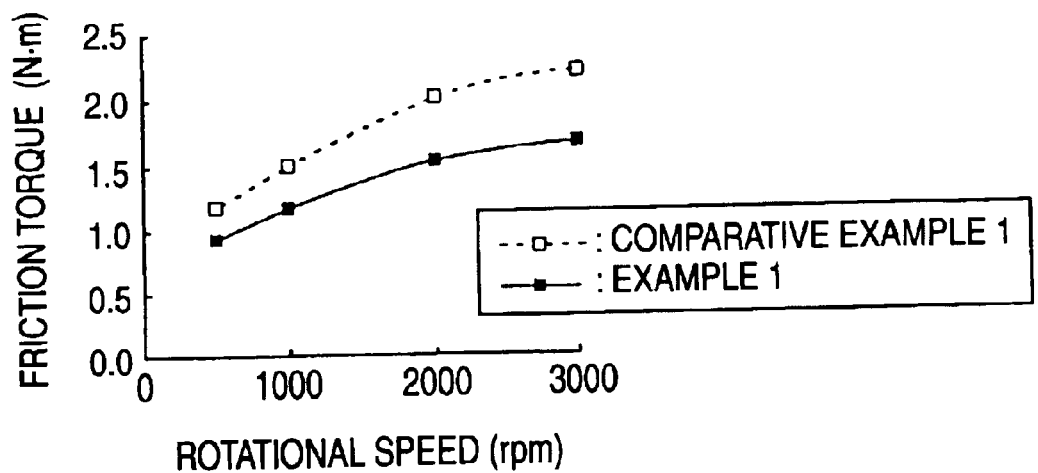
FIG. 4 is a graph illustrating the change of friction torque with respect to the rotational speed concerning Comparative Example 1 and Example 1 of the invention.
Figure 5:
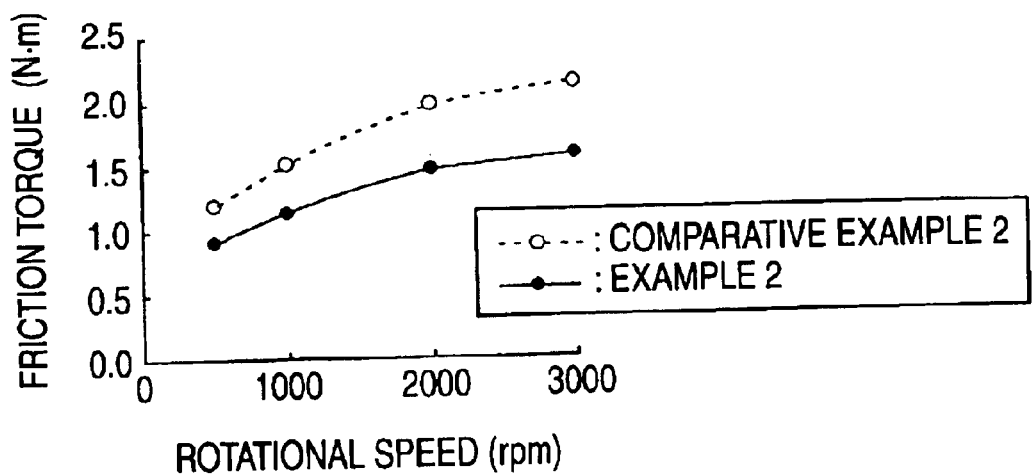
FIG. 5 is a graph illustrating the change of friction torque with respect to the rotational speed concerning Comparative Example 2 and Example 2 of the invention.

FIGS. 4 and 5 are graphs illustrating how the friction torque changed with respect to the rotational speed in the case of Comparative Example 1 and Example 1 and the case of Comparative Example 2 and Example 2, respectively. As shown in FIG. 4, the tapered roller bearing in Example 1 constantly exhibited smaller friction torque than the tapered roller bearing in Comparative Example 1. In addition, although the friction torque increased with an increase in the rotational speed, the increase rate was smaller for Example 1. Accordingly, the difference between the two tends to increase. The same holds true of the tapered roller bearing in Example 2 and the tapered roller bearing in Comparative Example 2, as shown in FIG. 5.

Figure 6:
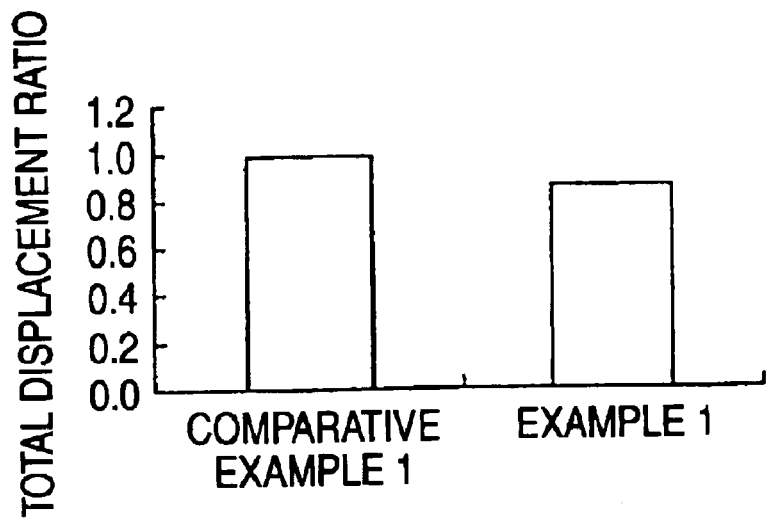
FIG. 6 is a graph illustrating the total displacement ratio concerning Comparative Example 1 and Example 1 of the invention.
Figure 7:
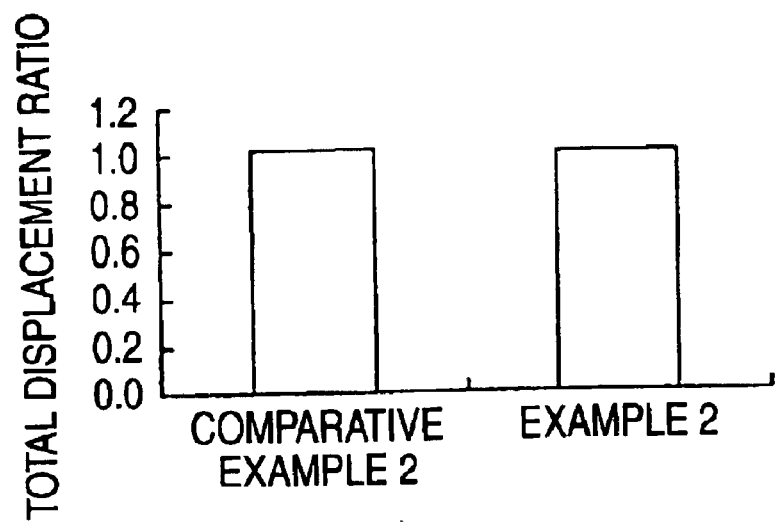
FIG. 7 is a graph illustrating the total displacement ratio concerning Comparative Example 2 and Example 2 of the invention.

In FIGS. 6 and 7, the total displacement ratios in Tables 2 and 3 are respectively plotted in graphs. As shown in the graphs, the total displacement ratio in Example 1 is smaller than that of Comparative Example 1, and excels in rigidity over that of Comparative Example 1. The total displacement ratio in Example 2 is equal to that in Comparative Example 2, and the rigidity of at least the conventional level is ensured.

Figure 8:
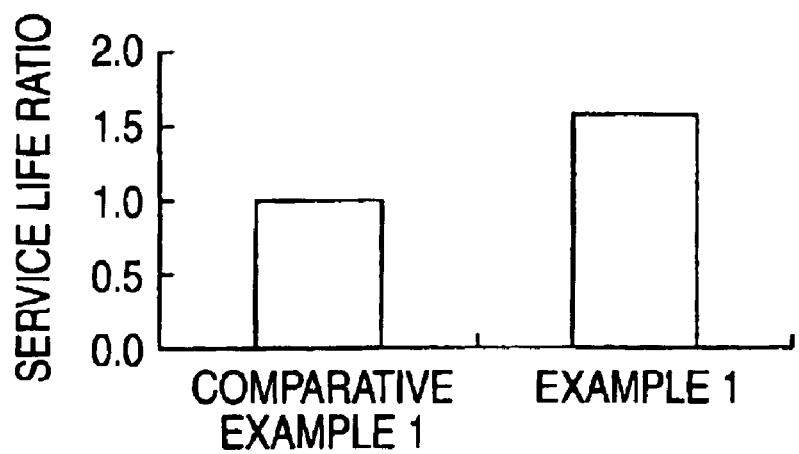
FIG. 8 is a graph illustrating the service life ratio concerning Comparative Example 1 and Example 1 of the invention.
Figure 9:
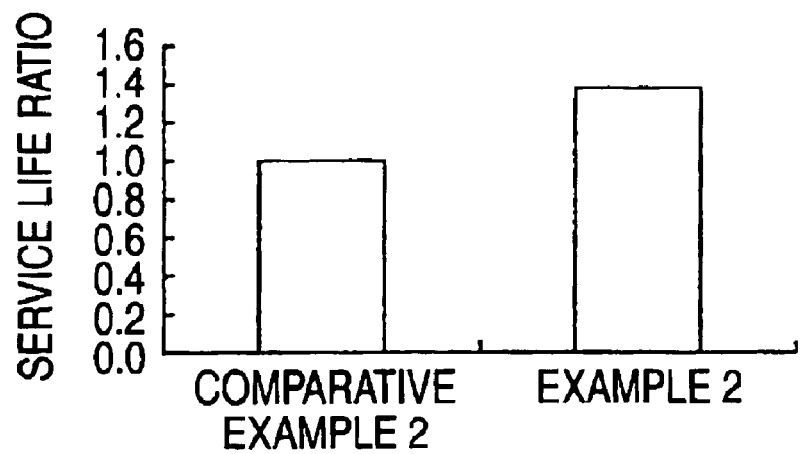
FIG. 9 is a graph illustrating the service life ratio concerning Comparative Example 2 and Example 2 of the invention.

In FIGS. 8 and 9, the service life ratios in Tables 2 and 3 are respectively plotted in graphs. As is evident from the graphs, it can be appreciated that the service life of both Examples 1 and 2 is substantially prolonged in comparison with Comparative Examples 1 and 2, respectively.

In accordance with the tapered roller bearing according to the present invention, the friction torque changes with a correlation with the PCD parameter, and by setting the PCD parameter in the range of 0.96 to 0.985, it is possible to provide a tapered roller bearing in which the friction torque is reduced while suppressing a decline in the load carrying capacity.

Further, in accordance with the tapered roller bearing according to the present invention, it is possible to reduce the friction torque without causing rigidity and the load carrying capacity to decline.

What is claimed is:

1. A tapered roller bearing comprising:

an outer ring, outside diameter of which is D, an inner ring, inside diameter of which is d; and a plurality of tapered rollers which are interposed between the outer ring and the inner ring, pitch circle diameter of which is dm, wherein a PCD parameter expressed by 2 dm/(D+d) is a value which falls within a range of 0.96 to 0.985.

2. The tapered roller bearing according to claim 1, wherein a contact angle $\alpha$ of the outer ring is set such that $22° \leq \alpha \leq 26°$.

3. The tapered roller bearing according to claim 1, wherein the PCD parameter is a value which falls within a range of 0.97 to 0.98.

* * * * *